United States Patent
Conger et al.

(10) Patent No.: US 8,690,690 B2
(45) Date of Patent: Apr. 8, 2014

(54) CONSTANT VELOCITY JOINT WITH QUICK CONNECTOR AND METHOD

(75) Inventors: Jonathan David Conger, Berkley, MI (US); Arvind Srinivasan, Troy, MI (US); Richard Lawrence Seidel, Macomb, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 0 days.

(21) Appl. No.: 13/170,547

(22) Filed: Jun. 28, 2011

(65) Prior Publication Data

US 2012/0004044 A1 Jan. 5, 2012

Related U.S. Application Data

(60) Provisional application No. 61/360,276, filed on Jun. 30, 2010.

(51) Int. Cl.
*F16D 3/226* (2006.01)

(52) U.S. Cl.
USPC .................. 464/146; 464/182; 464/906

(58) Field of Classification Search
USPC ............ 464/145, 173, 182, 901, 906, 146; 403/335, 336, 338, 341, 359.1, 359.5, 403/359.6
See application file for complete search history.

(56) References Cited

U.S. PATENT DOCUMENTS

| | | | |
|---|---|---|---|
| 4,325,232 A * | 4/1982 | Girguis | 464/906 X |
| 5,221,233 A | 6/1993 | Jacob | |
| 6,152,825 A * | 11/2000 | Doell | 464/906 X |
| 7,396,284 B2 | 7/2008 | Jacob et al. | |
| 7,604,545 B2 | 10/2009 | Jacob | |
| 7,621,816 B2 | 11/2009 | Weckerling et al. | |
| 7,632,189 B2 | 12/2009 | Schwarzler et al. | |
| 7,806,773 B2 | 10/2010 | Disser | |
| 7,854,658 B2 | 12/2010 | Schwarzler et al. | |
| 2008/0104844 A1 | 5/2008 | Lutz et al. | |
| 2008/0318693 A1 * | 12/2008 | Langer et al. | |
| 2009/0208276 A1 | 8/2009 | Szentmihalyi et al. | |
| 2009/0317182 A1 | 12/2009 | Szentmihalyi | |
| 2010/0105488 A1 | 4/2010 | Wormsbaecher et al. | |
| 2010/0275429 A1 | 11/2010 | Szentmihalyi et al. | |

FOREIGN PATENT DOCUMENTS

| | | |
|---|---|---|
| DE | 102007038878 | 2/2008 |
| EP | 1519063 | 3/2005 |
| EP | 1593900 B1 | 11/2005 |
| FR | 2903469 | 1/2008 |

(Continued)

OTHER PUBLICATIONS

Universal Joint and Driveshaft Design Manual. Warrendale, PA: Society of Automotive Engineers, 1979. p. 185-186. TJ1059.S62.*

*Primary Examiner* — Gregory Binda
*Assistant Examiner* — Josh Skroupa
(74) *Attorney, Agent, or Firm* — Harness, Dickey & Pierce, P.L.C.

(57) ABSTRACT

A shaft assembly that includes a propshaft member and a constant velocity joint. The constant velocity joint has an outer race, which is coupled for rotation with the propshaft member, an inner race, a plurality of bearing balls disposed between the outer and inner races to transmit rotary power therebetween, a shaft member coupled for rotation with the inner race, and a boot assembly that is sealingly engaged to the outer race and the shaft member. The shaft member defines a coupling portion that extends from the boot assembly. A method for coupling a shaft member to a driveline component is also provided.

6 Claims, 10 Drawing Sheets

(56) References Cited

FOREIGN PATENT DOCUMENTS

| | | |
|---|---|---|
| JP | 2003056590 A | 2/2003 |
| JP | 2009085380 A | 4/2009 |
| WO | WO-2006037389 A1 | 4/2006 |
| WO | WO-2006045362 A1 | 5/2006 |
| WO | WO-2006091906 A1 | 8/2006 |
| WO | WO-2007044003 A1 | 4/2007 |
| WO | WO-2008024108 A1 | 2/2008 |
| WO | WO-2008148373 A1 | 12/2008 |
| WO | WO-2008154913 A2 | 12/2008 |
| WO | WO-2009070174 A1 | 6/2009 |

* cited by examiner

CONSTANT VELOCITY JOINT WITH QUICK CONNECTOR AND METHOD

CROSS-REFERENCE TO RELATED APPLICATIONS

This application claims the benefit of U.S. Provisional Patent Application No. 61/360,276 filed Jun. 30, 2010, the disclosure of which is incorporated by reference as if fully set forth in detail herein.

FIELD

The present disclosure relates to a constant velocity joint with quick connector and a related assembly method.

BACKGROUND

This section provides background information related to the present disclosure which is not necessarily prior art.

Propshaft assemblies typically employ universal joints to permit vertical and/or horizontal offset between the output member of one vehicle component (e.g., a transmission or transfer case) and the input member of another vehicle component (e.g., an input pinion of an axle assembly). One common type of universal joint is a Cardan joint that employs a spider mounted on bearings between a pair of yokes. While such universal joints can be efficiently and cost effectively manufactured, they do not always transmit rotary power at a constant rotational velocity and moreover are suitable for use through a limited range of offsets between the output and input members.

Another type of universal joint is the constant velocity joint that employs a plurality of bearing balls between an outer race and an inner race. It is relatively common to employ to employ a multi-bolt adapter between the constant velocity joint and the input/output member of the other vehicle component. Such adapters are typically not desirable, as they require more assembly labor and add significant mass.

One recently proposed alternative to the multi-bolt adapter involves the installation of the (output or input) member of the driveline component through a seal boot during the assembly process (i.e., the process of installing the universal joint to a driveline component of the vehicle), to engage the member of the driveline component directly to the inner race. As the seal boot is typically filled with a lubricant, and as the seal boot obscures both the member of the driveline component and the inner race, the assembly technician must align the member and the inner race to one another in a blind manner (i.e., by feel), which can be somewhat difficult and time consuming. Moreover, the seal boot must be clamped to the member of the driveline component after installation of the member to the inner race and consequently, the assembly technician must perform additional work on the vehicle assembly line.

Since the interior of the constant velocity joint cannot be closed until the member of the driveline component is engaged to the inner race, there are concerns for both contamination of the interior of the constant velocity joint and the leaking of lubricant from the interior of the constant velocity joint. Moreover, the constant velocity joint cannot be balanced as a unit; rather a tooling component, which simulates the member of the driveline component, is mated to the inner race when the constant velocity joint is rotationally balanced.

The presence of the seal boot and the inability to support the inner race is not conducive to the use of an interference fit between the member of the driveline component and the inner race in some situations and as such, the assembly may not be lash-free and may cause issues with noise, vibration and harshness. Some lash-free designs have been proposed, but these designs typically require a threaded mechanism to assemble or disassemble the member from the inner race. Such threaded mechanisms are typically cumbersome to operate, requiring the use of open end wrenches to rotate a nut that is employed to generate an axially directed force that drives the member of the driveline component and the inner race together.

There remains a need in the art for an improved constant velocity joint.

SUMMARY

This section provides a general summary of the disclosure, and is not a comprehensive disclosure of its full scope or all of its features.

In one form, the present teachings provide a shaft assembly that includes a propshaft member and a constant velocity joint. The constant velocity joint has an outer race, which is coupled for rotation with the propshaft member, an inner race, a plurality of bearing balls disposed between the outer and inner races to transmit rotary power therebetween, a shaft member coupled for rotation with the inner race, and a boot assembly that is sealingly engaged to the outer race and the shaft member. The shaft member defines a coupling portion that extends from the boot assembly.

In another form, the present teachings provide a method for coupling a shaft member to a driveline component having a shaft. The method includes: fully assembling a constant velocity joint having a shaft member, an outer race, an inner race, a plurality of bearing balls and a boot assembly, the bearing balls being received between the inner race and the outer race and being configured to facilitate the transmission of torque therebetween, the shaft member being fixedly coupled to the inner race, the boot assembly being sealingly engaged to the outer race and the shaft member, the shaft member having a coupling portion that extends outwardly from the boot assembly; and installing the coupling portion directly to the shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
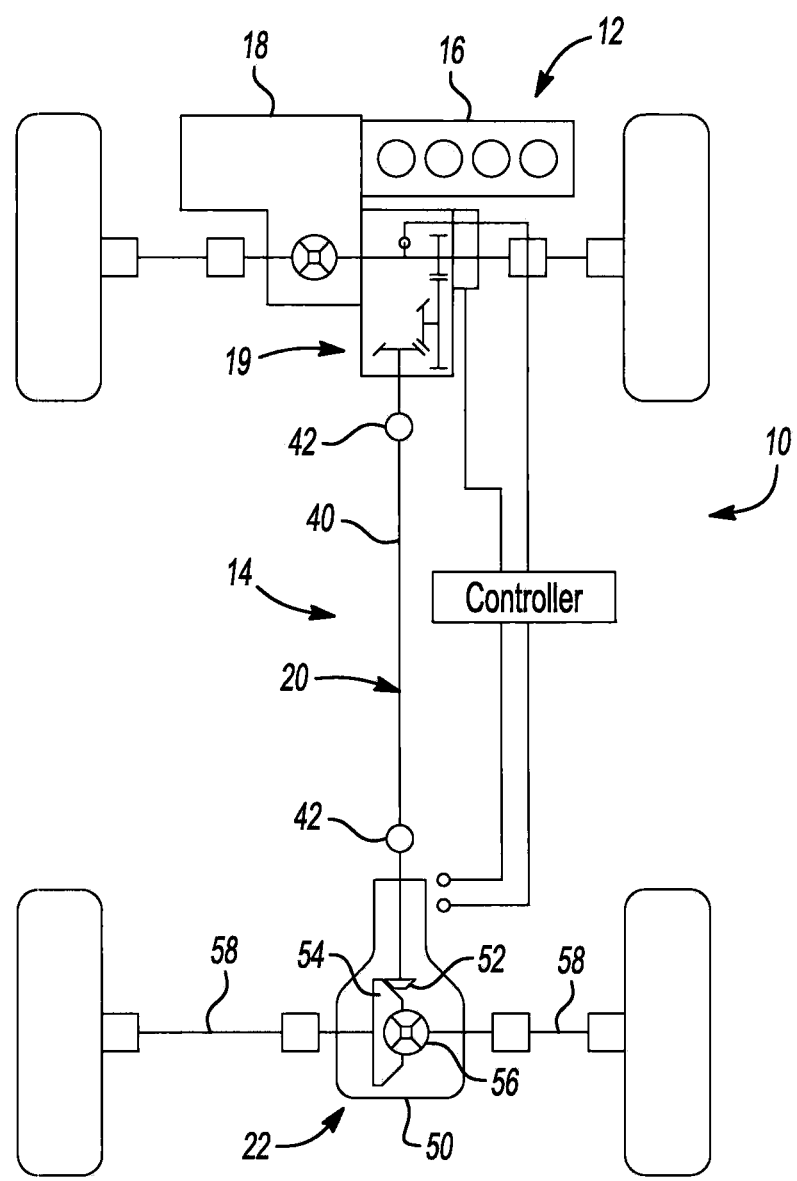
FIG. 1 is a schematic illustration of an exemplary vehicle constructed in accordance with the teachings of the present disclosure.

With reference to FIG. 1 of the drawings, an exemplary vehicle constructed in accordance with the teachings of the present disclosure is generally indicated by reference numeral 10. The vehicle 10 can include a power train 12 and a drive train 14. The power train 12 can comprise a source of rotary power, such as an electric motor and/or an internal combustion engine 16, and a transmission 18, and a power take-off unit 19, while the drive train 14 can be configured to transmit rotary power between the power train 12 and one or more sets of vehicle wheels. In the particular example provided, the vehicle 10 has an all-wheel drive configuration and as such, the drive train 14 comprises a propeller shaft 20 and a rear axle assembly 22. It will be appreciated, however, that the teachings of the present disclosure are not limited to all-wheel drive vehicles and can be employed in vehicles having other types of drive configurations, including those with a front wheel drive configuration, those with a rear wheel drive configuration, and those with a four-wheel drive configuration.

The propeller shaft 20 is configured to transmit rotary power between the power take-off unit 19 and the rear axle assembly 22 and can comprise a propshaft member 40 and a pair of universal joints 42 that are coupled to the opposite ends of the propshaft member 40. The propshaft member 40 can be a generally hollow tube and if desired, various vibration damping devices can be installed thereto to attenuate one or more types of vibration (e.g., bending mode vibration, torsional vibration, shell mode vibration). At least one of the universal joints 42 is a constant velocity joint, but in the example provided, each of the universal joints is a constant velocity joint. The discussion below will focus on the universal joint (constant velocity joint) 42 that is disposed on an end of the propshaft member 40 proximate the axle assembly 22, but it will be appreciated that the other universal joint (constant velocity joint) 42 could be configured in a similar manner.

The rear axle assembly 22 can comprise an axle housing 50, an input pinion 52, a ring gear 54, a differential assembly 56, and a pair of axle shafts 58. The input pinion 52 can be mounted for rotation in the axle housing 50 about a first axis (generally coincident with the longitudinal axis of the vehicle 10) and can be meshingly engaged with the ring gear 54 to drive the ring gear 54 about a second axis that is perpendicular to the first axis. The differential assembly 56 can be any type of differential assembly, such as an open-type or a locking-type differential assembly, and can have a gear set with bevel gears or helical gears. Examples of suitable differential assemblies are found in U.S. Pat. Nos. 7,232,399 and 7,572,202, the disclosures of which are hereby incorporated by reference as if fully set forth in detail herein. Briefly, the differential assembly 56 can include a case (not specifically shown), which can be coupled to the ring gear 54 for rotation therewith, and a gear set (not specifically shown) that can be received in the case. The gear set can include a plurality of pinion gears and a pair of side gears to which the axle shafts 58 can be coupled.

Figure 2:
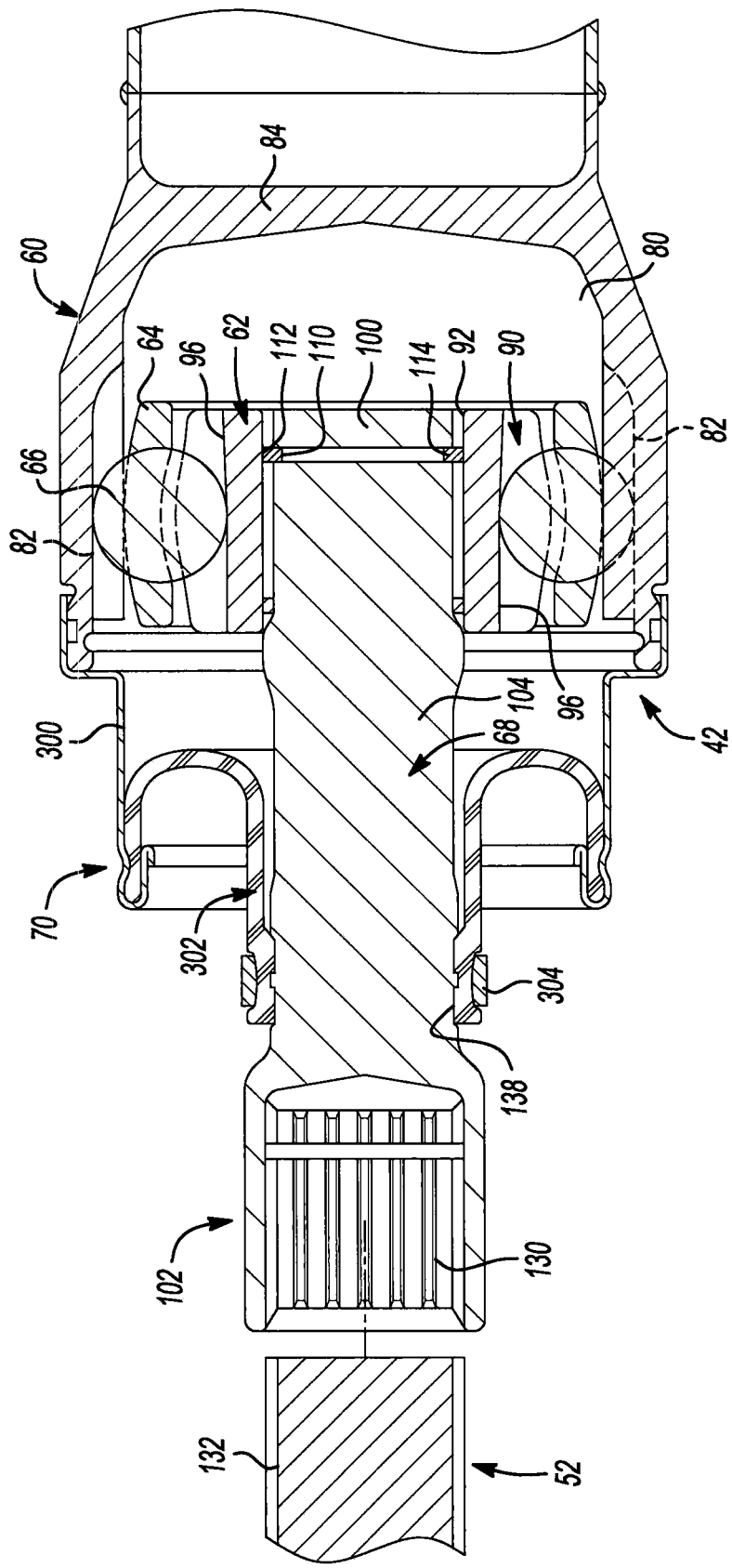
FIG. 2 is a longitudinal cross-sectional view of a portion of the vehicle of FIG. 1 illustrating the constant velocity joint in more detail.

With reference to FIG. 2, the constant velocity joint 42 can include an outer race member 60, an inner race member 62, a cage 64, a plurality of bearing balls 66, a shaft member 68 and a boot assembly 70.

The outer race member 60 can define a generally cup-shaped cavity 80 having a plurality of first bearing surfaces 82 against which the bearing balls 66 can be engaged. In the particular example provided, each first bearing surface 82 is generally U-shaped, but it will be appreciated that the first bearing surfaces 82 could be contoured in another manner if desired. An end of the outer race member 60 opposite the cup shaped cavity 80 can be configured to be fixedly coupled to the shaft member 68 in a desired manner, such as by welding. A wall member 84 is disposed between the opposite axial ends of the outer race member 60 such that the cavity 80 is not in fluid communication with an interior of the shaft member 68 when the outer race member 60 is fixedly coupled to the shaft member 68.

The inner race member 62 can be an annular structure that can define a plurality of bearing tracks 90 and a coupling aperture 92 that can be configured to matingly engage the shaft member 68. Each of the bearing tracks 90 can define a second bearing surface 96 that can be configured to receive a corresponding one of the bearing balls 66. In the particular example provided, the second bearing surfaces 96 are generally U-shaped in cross-section and extend in a direction transverse to or helically about a central axis of the coupling aperture 92.

Each of the bearing balls 66 can be engaged to an associated pair of the first and second bearing surfaces 82 and 96 to facilitate the transmission of rotary power between the outer and inner race members 60 and 62. The cage 64 can be mounted concentrically about the inner race member 62 and can limit movement of the bearing balls 66 such that the bearing balls 66 are disposed in a coplanar arrangement that establishes a homokinetic plane.

The shaft member 68 can comprise a first coupling portion 100, a second coupling portion 102, and a shaft structure 104 that can be fixedly coupled to the first and second coupling portions 100 and 102 for rotation therewith. The first coupling portion 100 can be fixedly coupled to the inner race member 62. In the particular example provided, the coupling aperture 92 in the inner race member 62 defines a plurality of spline teeth that are engaged via an interference fit with corresponding spline teeth formed on the first coupling portion 100. If desired, the first coupling portion 100 and the inner race member 62 can engage one another in a lash-less manner (i.e., so that no rotation of one relative to the other is permitted). For example, the first coupling portion 100 can be engaged to the coupling aperture 92 via an interference fit and/or a bond or weld can be employed to rotationally fix the first coupling portion 100 and the inner race member 62 to one another. Various means may be employed to retain the first coupling portion 100 to the inner race member 62 in an axial direction, such as bonds or welds. In the example provided, annular grooves 110 and 112 are formed into the first coupling portion 100 and the inner race member 62 that are configured to receive a retaining ring 114.

The second coupling portion 102 can be configured to engage another component of the vehicle 10 (FIG. 1) to facilitate the transmission of rotary power between the constant velocity joint 42 and the component. In the particular example provided, the second coupling portion 102 comprises an internally splined aperture 130 that is configured to matingly engage a splined male segment 132 formed on the input pinion 52 of the rear axle assembly 22 (FIG. 1). If desired, the second coupling portion 102 and the male segment 132 can engage one another in a lash-less manner (i.e., so that no rotation of one relative to the other is permitted), such as via an interference fit between the second coupling portion 102 and the male segment 132.

The shaft structure 104 can be fixedly coupled to the first and second coupling portions 100 and 102 and in the particular example provided, comprises a solid shaft. The shaft structure 104 can be contoured as desired and in the particular example includes a boot clamp groove 138 that is configured to receive a corresponding end of the boot assembly 70.

The shaft member 68 may be formed via any suitable process. In the particular example provided, the shaft member 68 is forged and turned, the second bearing surfaces are machined, the male splines associated with the first coupling portion 100 are roll formed, and the splines associated with the second coupling portion 102 are formed via blind broaching.

Figure 3:
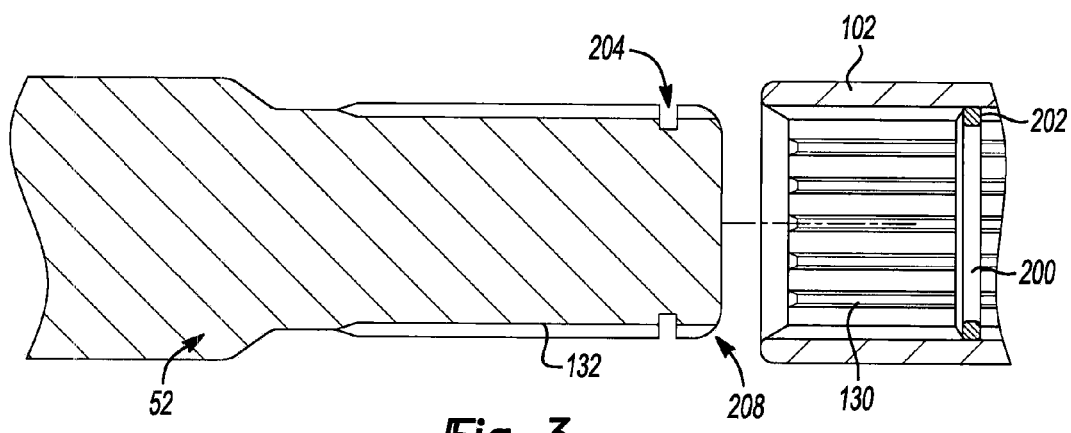
FIG. 3 is an exploded longitudinal section view of a portion of the vehicle of FIG. 1 illustrating a first connection method for coupling the second coupling portion of the constant velocity joint with another component of the vehicle.

Various means may be employed to retain the second coupling portion 102 to the male segment 132 in an axial direction. With reference to FIG. 3, one suitable means comprises a retaining ring 200 that is received in annular grooves 202 and 204 formed in the second coupling portion 102 and the male segment 132, respectively. In the example illustrated, the retaining ring 200 is received into the annular groove 202 formed in the second coupling portion 102 and the male segment 132 is contoured to define an expansion zone 208 that causes the retaining ring 200 to expand radially as the expansion zone 208 is introduce and forced through the retaining ring 200. Those of skill in the art will appreciate that alignment of the grooves 202 and 204 to one another will permit the retaining ring 200 to contract in a radial direction so as to be disposed axially in-line with portions of both grooves 202 and 204 to thereby inhibit or resist axial movement of the second coupling portion 102 relative to the male segment 132 in a direction that tends to withdraw the male segment 132 from the second coupling portion 102.

Figure 4:
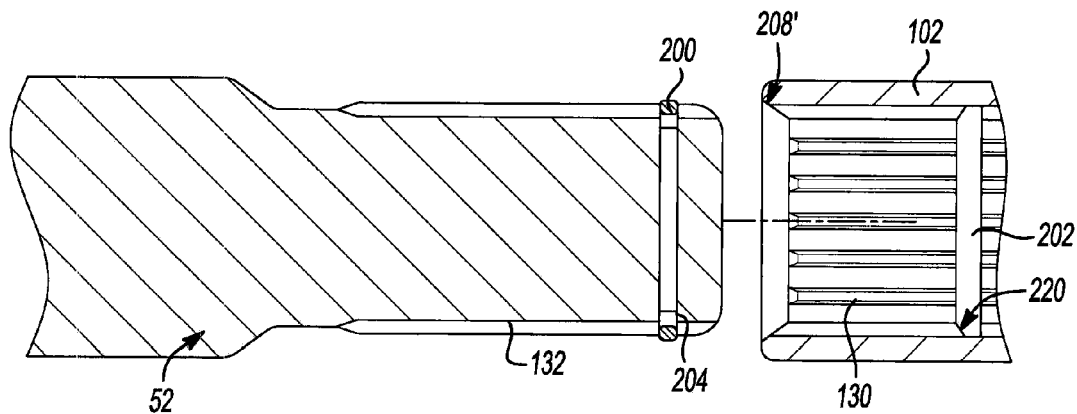
FIG. 4 is an exploded longitudinal section view of a portion of the vehicle of FIG. 1 illustrating a second connection method for coupling the second coupling portion of the constant velocity joint with another component of the vehicle.

The example of FIG. 4 is generally similar to that of FIG. 3, except that the retaining ring 200 is installed to the groove 204 in the male segment 132, the insertion zone 208' is formed on the second coupling portion 102, and the second coupling portion 102 is configured with a decoupling zone 220. In the particular example provided, the insertion zone 208' is formed by a chamfer that defines a conical surface; contact between the conical surface and the retaining ring 200 as the male segment 132 is inserted into the second coupling portion 102 constricts the retaining ring 200 radially such that the male segment 132 may be fully inserted into the second coupling portion 102. Alignment of the grooves 202 and 204 to one another permits the retaining ring 200 to expand radially outwardly such that it is disposed axially in-line with portions of both of the grooves 202 and 204 to thereby inhibit or resist axial movement of the second coupling portion 102 relative to the male segment 132 in a direction that tends to withdraw the male segment 132 from the second coupling portion 102. In the event that the second coupling portion 102 is to be removed from the male segment 132, the decoupling zone 220 can be employed to constrict the retaining ring 200. In this regard, the decoupling zone 220 can comprise a chamfered surface formed on an axial side of the groove 202 in the second coupling portion 102. Contact between the chamfered surface and the retaining ring 200 as the second coupling portion 102 is moved relative to the male segment 132 in a withdrawing direction constricts the retaining ring 200 radially such that the male segment 132 may be fully withdrawn from the second coupling portion 102. Those of skill in the art will appreciate from this disclosure that the cone angle of the chamfers forming the insertion zone 208' and the decoupling zone 220 will help to dictate the amount of axial force that need be applied between the second coupling portion 102 and the male segment 132 to assemble or disassemble the second coupling portion 102 and the male segment 132.

Figure 5A:
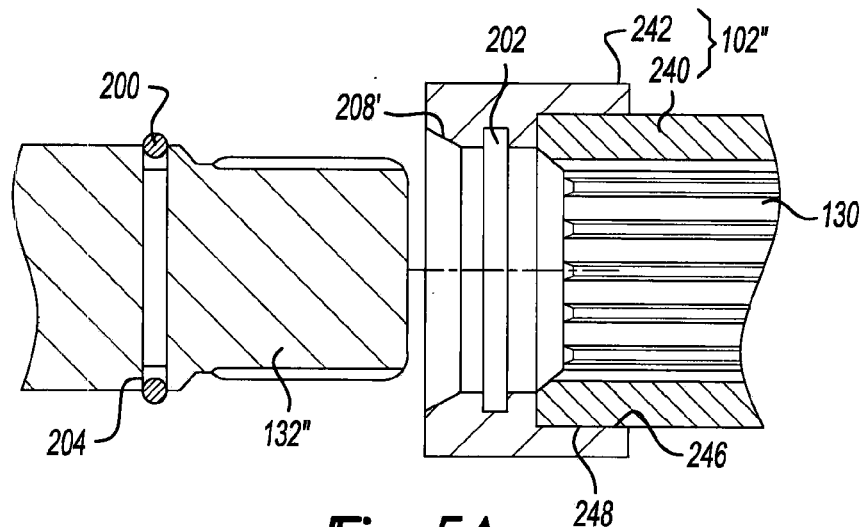
FIG. 5A is an exploded longitudinal section view of a portion of the vehicle of FIG. 1 illustrating a third connection method for coupling the second coupling portion of the constant velocity joint with another component of the vehicle.
Figure 5B:
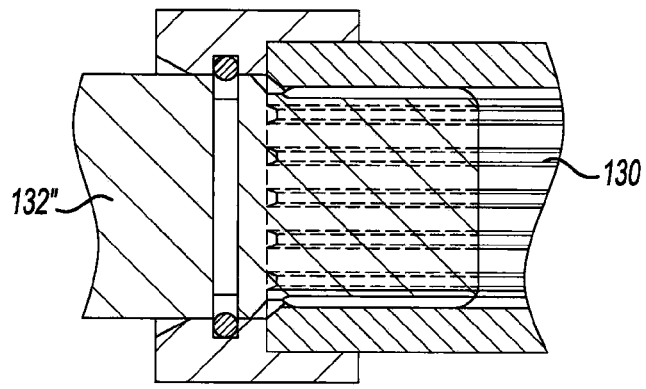
FIG. 5B is a longitudinal section view depicting the second coupling portion of the constant velocity joint shown in FIG. 5A as coupled with the other component of the vehicle.
Figure 5C:
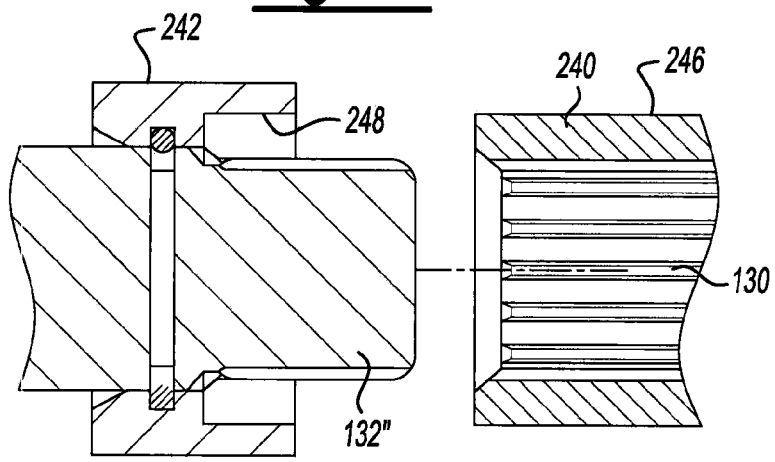
FIG. 5C is an exploded longitudinal section view depicting the second coupling portion of the constant velocity joint shown in FIG. 5A as having been removed from the other component of the vehicle.

The example of FIGS. 5A and 5B is similar to that of FIG. 4, except that the second coupling portion 102" comprises first and second coupling members 240 and 242 that are threadably coupled to one another. The first coupling member 240 can define the internally splined aperture 130 and a set of male threads 246, while the second coupling member 242 can define the groove 202, the insertion zone 208' and a set of female threads 248. The male segment 132" can be configured such that it can be substantially engaged to the internally splined aperture 130 prior to engagement of the retaining ring 200, which can be carried in the groove 204 in the male segment 132", to the conical surface of the insertion zone 208'. As a decoupling zone is not provided, removal of the male segment 132" from the internally splined aperture 130 may be facilitated through the decoupling of the second coupling member 242 from the first coupling member 240. To aid in the decoupling of the first and second coupling members 240 and 242 from one another, wrench flats or other features (not shown) may be formed onto or into one or both of the first and second coupling members 240 and 242 to permit a tool or tools to be employed to unthread the second coupling member 242 from the first coupling member 240. It will be appreciated that the second coupling member 242 can be retained on the male segment 132" as shown in FIG. 5C and can be re-threaded to the first coupling member 240 to permit the male segment 132" to be reassembled to the second coupling portion 102". The threaded connection between the first and second coupling members 240 and 242 may be advantageous when first assembling or reassembling the second coupling portion 102" and the male segment 132" if an interference fit is employed between the second coupling portion 102" and the male segment 132".

Figure 6A:
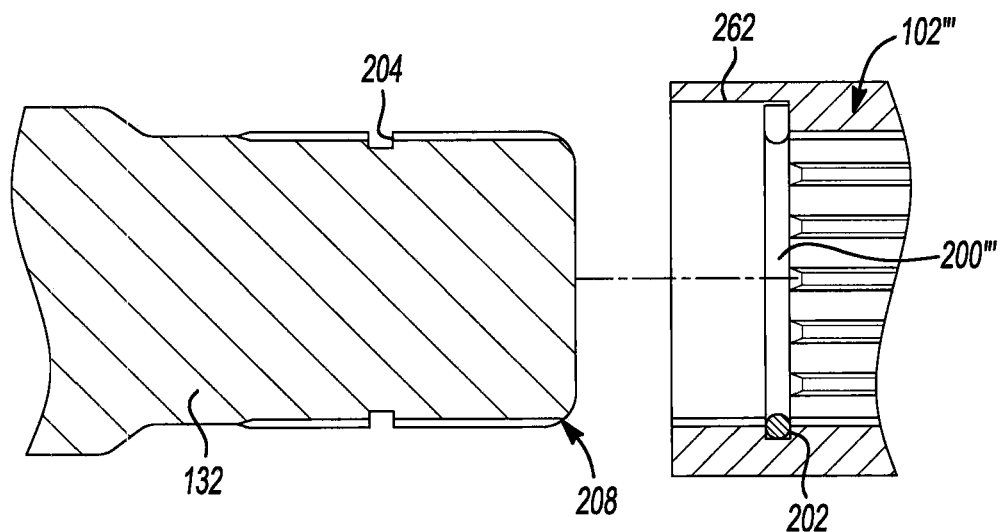
FIG. 6A is an exploded longitudinal section view of a portion of the vehicle of FIG. 1 illustrating a fourth connection method for coupling the second coupling portion of the constant velocity joint with another component of the vehicle.
Figure 6B:
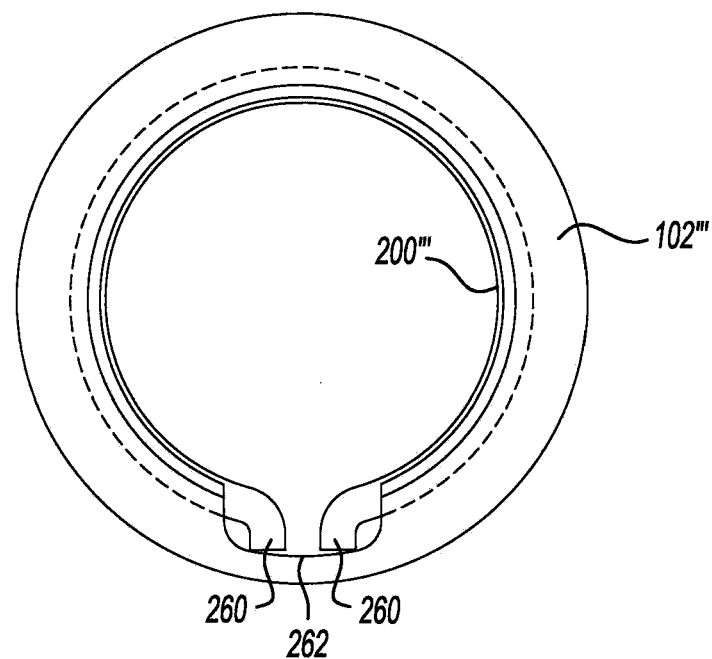
FIG. 6B is an end view of the other component of the vehicle depicted in FIG. 6A showing the tang pocket in more detail.

The example of FIGS. 6A and 6B is generally similar to that of FIG. 3, except that the retaining ring 200''' includes a pair of tangs 260 that are received into an axially extending tang groove 262 formed in the second coupling portion 102'''. When removal of the second coupling portion 102''' from the male segment 132''' is desired, a tool (not shown) may be inserted into tang groove 262 to urge the tangs 260 apart from one another to expand the retaining ring 200'''.

Returning to FIG. 2, the boot assembly 70 can form a seal between the outer race member 60 and the shaft member 68. In the particular example provided, the boot assembly 70 comprises a seal housing 300, a seal boot 302, and a boot clamp 304. The seal housing 300 can be sealingly engaged to the outer race member 60 and can extend axially toward the second coupling portion 102. The seal boot 302 can be formed of a suitable material, such as a resilient elastomeric material. A first end of the seal boot 302 can be fixedly and sealingly coupled to an end of the seal housing 300 opposite the outer race member 60, while a second, opposite end of the seal boot 302 can be received over the boot clamp groove 138 and sealingly engaged to the shaft member 68 to close the cavity 80 in the outer race member 60. The portion of the seal boot 302 between the first and second ends can have a generally toric shape that can define an annular, generally C-shaped channel. The boot clamp 304 can be engaged to the second end of the seal boot 302 to axially retain the second end of the seal boot 302 to the shaft member 68. A suitable lubricant, such as a grease, an oil or a traction fluid, can be received in the cavity 80 to lubricate the bearing balls 66 and the first and second bearing surfaces 82 and 96.

It will be appreciated from this disclosure that the constant velocity joint 42 can be entirely pre-assembled prior to the coupling of the second coupling portion 102 to the component of the vehicle 10 (FIG. 1), i.e., to the male segment 132 in the example provided. Accordingly, the lubricant-filled interior of the constant velocity joint 42 need not be opened or accessed during installation of the constant velocity joint 42, less labor is required at assembly to install the constant velocity joint 42 relative to other known constant velocity joints, and the mating of the component of the vehicle (i.e., the male segment 132 of the input pinion 52 in the example provided) to the constant velocity joint 42 (i.e., to the second coupling portion 102) may be performed by an assembly technician who can directly view the rotational and/or axial alignment of the second coupling portion 102 to the male segment 132. This latter point renders the constant velocity joint 42 easier to install to a vehicle as compared with other known constant velocity joints. Also advantageously, the pre-assembled constant velocity joint 42 can be rotationally balanced in its entirety prior to installation to the vehicle 10 (FIG. 1) or another mating component (e.g., the input pinion 52 (FIG. 1)).

Figure 7:
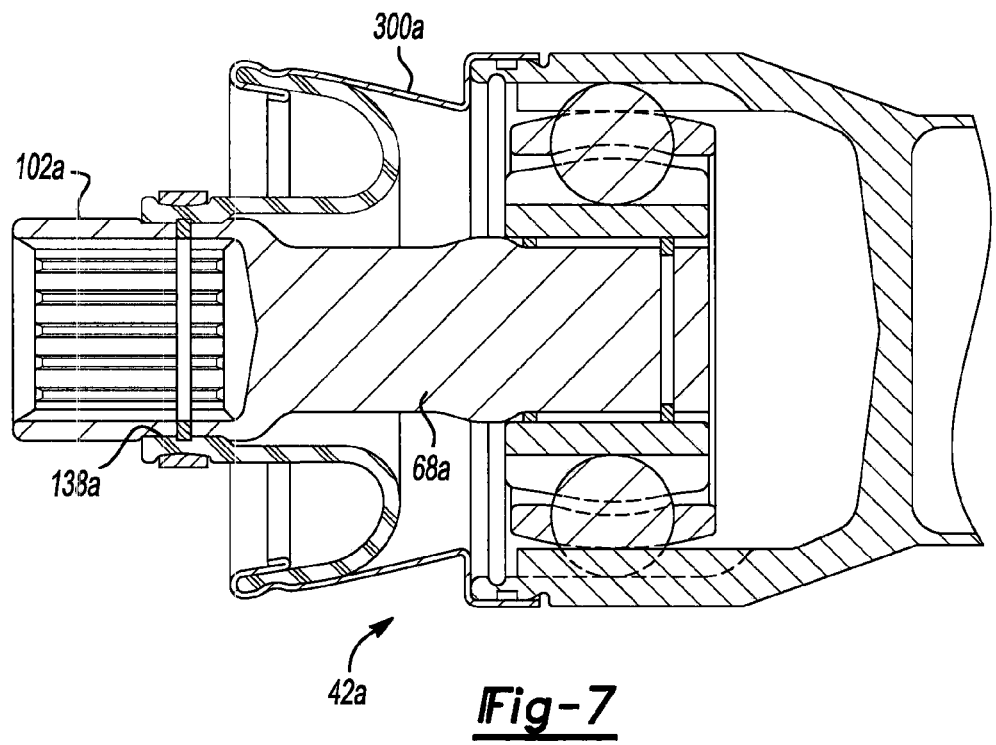
FIG. 7 is a longitudinal cross-sectional view of a second constant velocity joint constructed in accordance with the teachings of the present disclosure.

A second constant velocity joint constructed in accordance with the teachings of the present disclosure is illustrated in FIG. 7 and is generally indicated by reference numeral 42a. The constant velocity joint 42a is generally similar to the constant velocity joint 42 of FIGS. 1 and 2 except that the boot clamp groove 138a is formed on an exterior surface of the second coupling portion 102a, which facilitates an overall reduction in length of the shaft member 68a (relative to the shaft member 68 of FIG. 2) and a corresponding reduction in length of the constant velocity joint 42a relative to the overall length of the constant velocity joint 42 (FIG. 2). If desired, the seal housing 300a can be altered from that which is shown in FIG. 2 to permit articulation of the shaft member 68a over an equivalent or relatively larger angular range.

Figure 8:
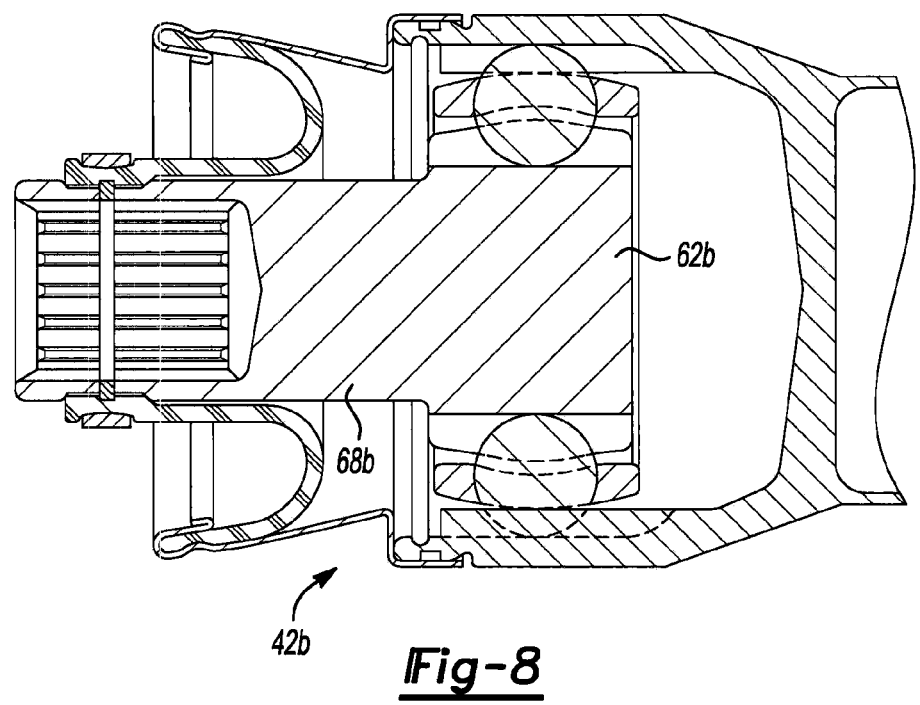
FIG. 8 is a longitudinal cross-sectional view of a third constant velocity joint constructed in accordance with the teachings of the present disclosure.

A third constant velocity joint constructed in accordance with the teachings of the present disclosure is illustrated in FIG. 8 and is generally indicated by reference numeral 42b. The constant velocity joint 42b is generally similar to the constant velocity joint 42a of FIG. 7, except that the inner race member 62b and the shaft member 68b are unitarily formed. In the example provided, the inner race member 62b and the shaft member 68b are unitarily formed as a forging and the shaft member 68b is formed as a solid component.

Figure 9:
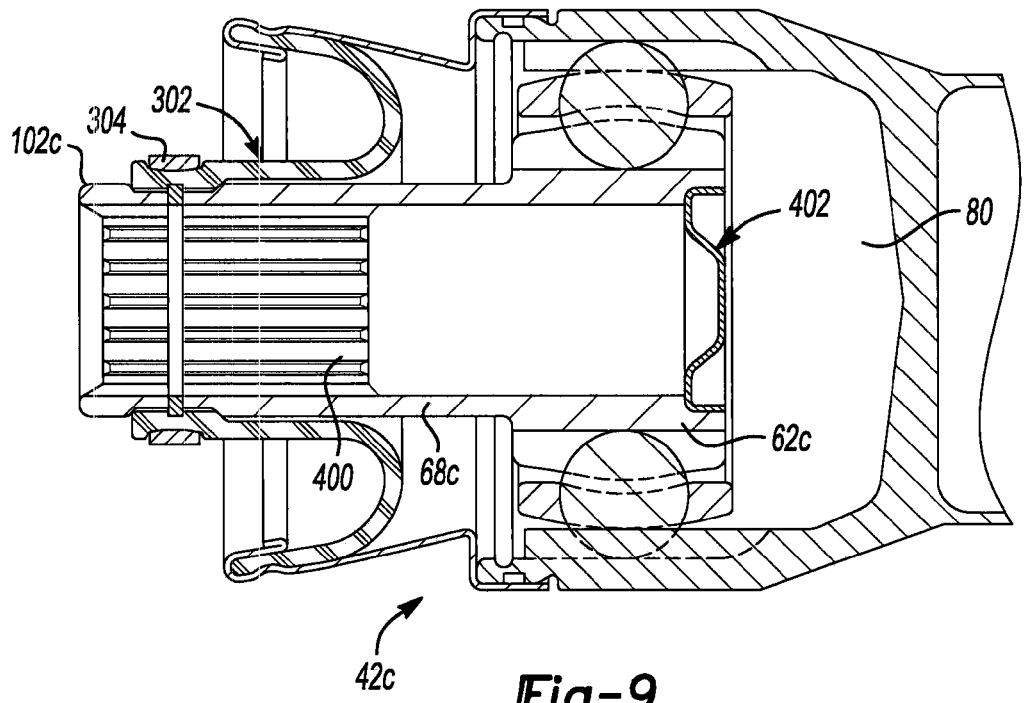
FIG. 9 is a longitudinal cross-sectional view of a fourth constant velocity joint constructed in accordance with the teachings of the present disclosure.

A fourth constant velocity joint constructed in accordance with the teachings of the present disclosure is illustrated in FIG. 9 and is generally indicated by reference numeral 42c. The constant velocity joint 42c is generally similar to the constant velocity joint 42b of FIG. 8, except that a through bore 400 is formed through the shaft member 68c and the inner race member 62c to permit the splines of the second coupling portion 102c to be formed via through-broaching. A seal or plug 402 may be installed to the shaft member 68c/inner race member 62c to inhibit fluid communication through the through bore 400 between the second coupling portion 102c and the cavity 80.

Figure 10:
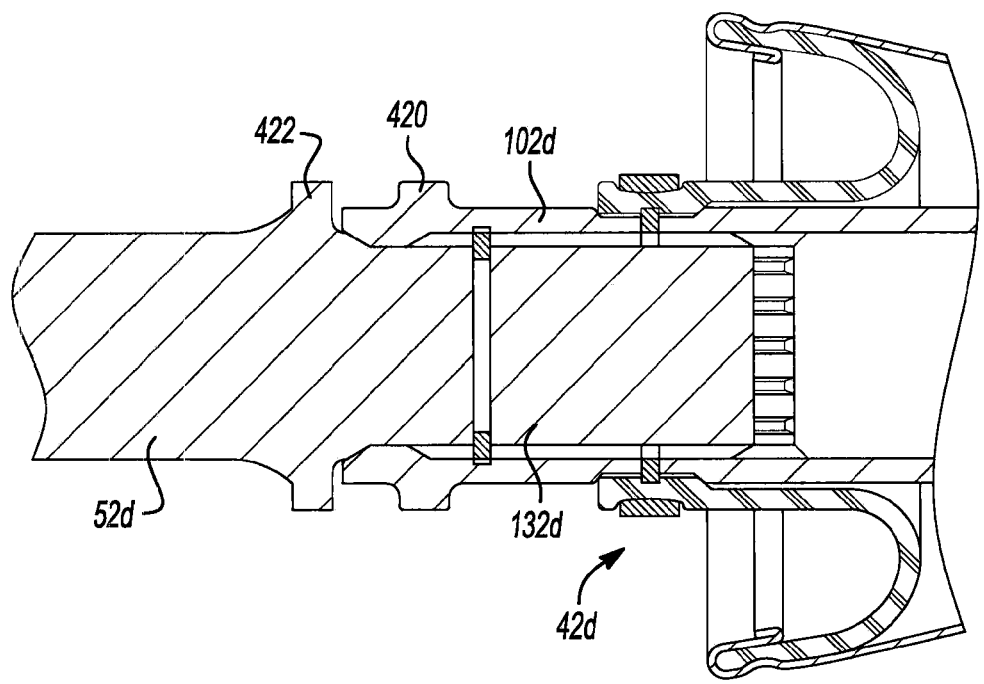
FIG. 10 is a longitudinal cross-sectional view of a fifth constant velocity joint constructed in accordance with the teachings of the present disclosure.

A portion of a fifth constant velocity joint constructed in accordance with the teachings of the present disclosure is illustrated in FIG. 10 and is generally indicated by reference numeral 42d. The constant velocity joint 42d is generally similar to the constant velocity joint 42a of FIG. 7 except that the second coupling portion 102d includes a first shoulder 420 and the male segment 132d of the input pinion 52d includes a second shoulder 422. The provision of first and second shoulders 420 and 422 may be advantageous in situations where an interference fit is employed between the input pinion 52d and the second coupling portion 102d. In such situations, a tool (not shown) can be fitted to the input pinion 52d and the second coupling portion 102d to apply an axially directed force to the first and second shoulders 420 and 422 to install the second coupling portion 102d to the input pinion 52d or to remove the second coupling portion 102d from the input pinion 52d. The axially directed force can be produced by any appropriate means, examples of which include a mechanical means (e.g., via a threaded mechanism, slide hammer and/or clamp) or a means that employs fluid pressure (e.g., via a hydraulically operated cylinder).

Figure 11:
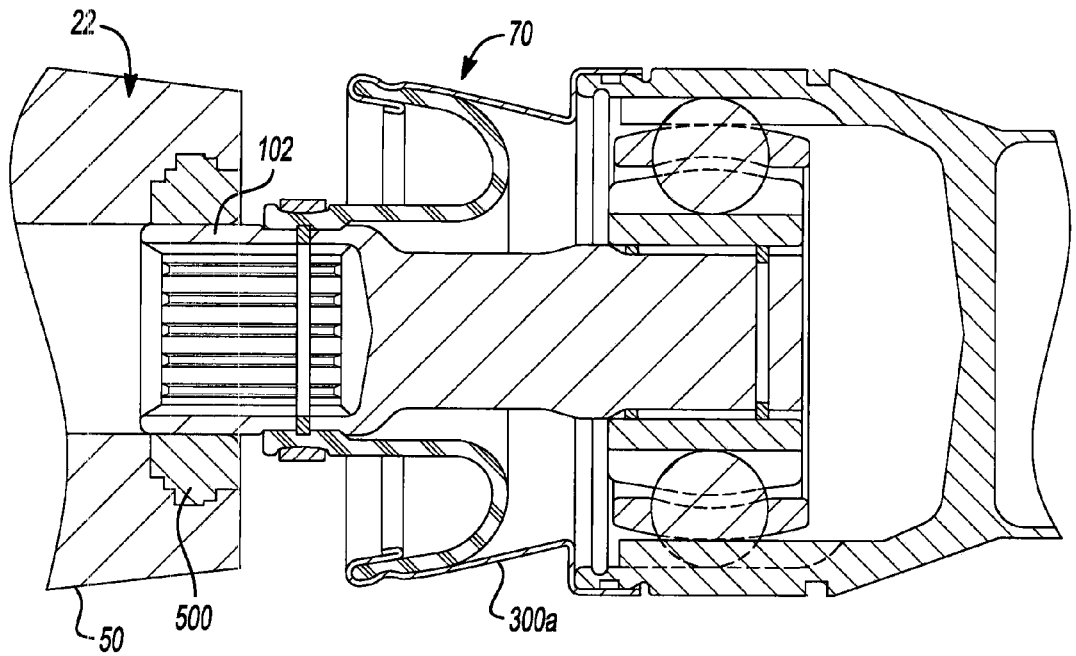
FIG. 11 is a longitudinal cross-sectional view of a portion of the vehicle of FIG. 1 illustrating the boot seal of the constant velocity joint axially proximate an oil seal in the axle housing to additionally function as a debris deflector.

With reference to FIG. 11, the boot assembly 70 can additionally function as a debris deflector that protects an oil seal 500 associated with the component of the vehicle 10 (i.e., the axle assembly 22 in the example provided). In this regard, placement of the boot assembly 70 in a location that is axially proximate the axle housing 50 such that the boot assembly 70 shrouds the oil seal 500 permits the boot assembly 70 (e.g., the seal housing 300a) to shroud the portion of the axle housing 50 into which the oil seal 500 is received. While the oil seal 500 is depicted as forming a seal against an exterior cylindrical surface defined by the second coupling portion 102, those of skill in the art will appreciate that the oil seal 500 could be configured to sealingly engage the input pinion 52 (FIG. 2) in the alternative.

Figure 12:
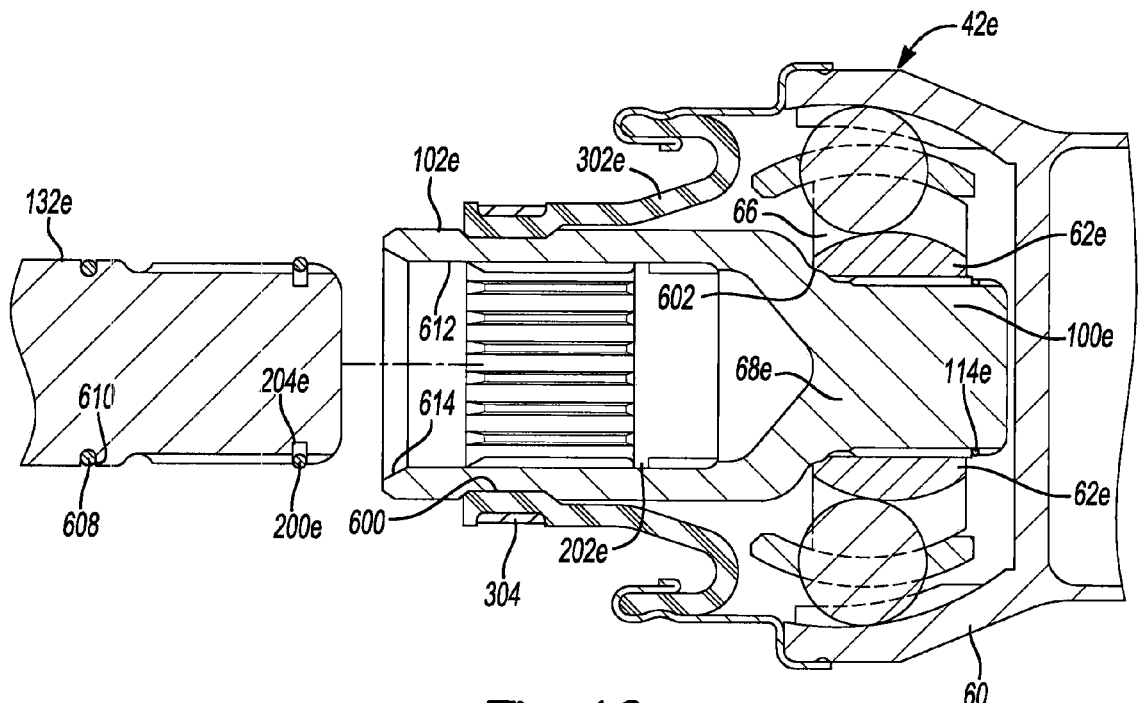
FIG. 12 is a longitudinal cross-sectional view of a sixth constant velocity joint constructed in accordance with the teachings of the present disclosure.
Figure 13:
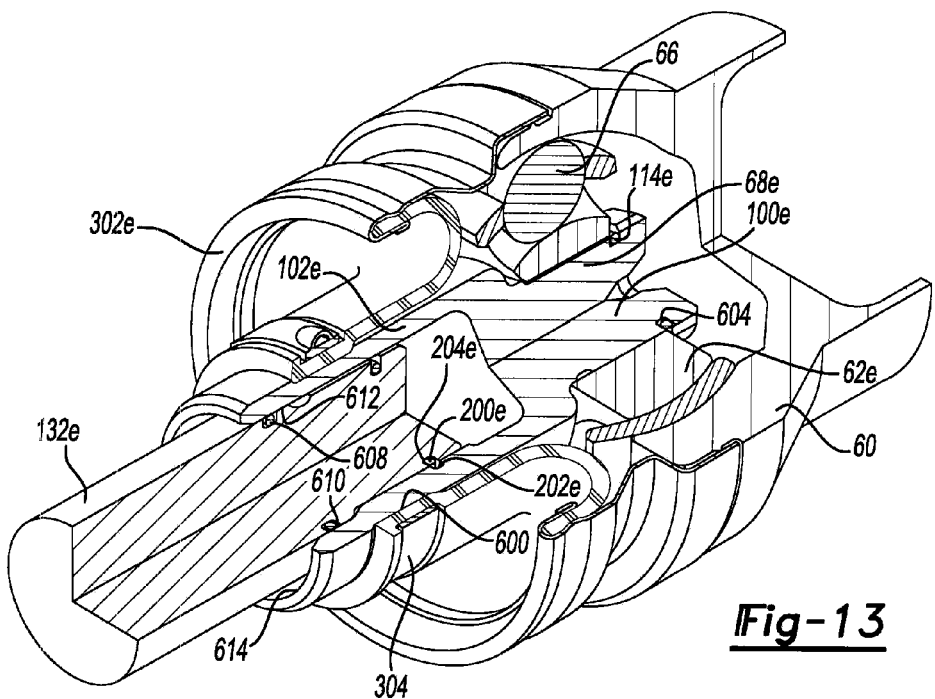
FIG. 13 is a perspective, partly sectioned view of the constant velocity joint of FIG. 12.

With reference to FIGS. 12 and 13, a sixth constant velocity joint constructed in accordance with the teachings of the present disclosure is generally indicated by reference numeral 42e. The constant velocity joint 42e can be generally similar to the constant velocity joints 42 and 42a of FIGS. 2 and 7, respectively, except that the shaft member 68e can be relatively shorter than the shaft members 68 and 68a, respectively, such that the splines of the male segment 132e are engaged to the splines of the internally splined aperture 130e at a location that is at least partially within the seal boot 302e and the seal boot 302e is sealingly engaged directly to the second coupling portion 102e. In the particular example provided, the splines of the male segment 132e are engaged to the splines of the internally splined aperture 130e at a location that is completely within the seal boot 302e and a groove 600 is formed in the second coupling portion 102e for receipt of the boot clamp 304. Construction in this manner places the spline-to-spline interface between the shaft member 68e and the male segment 132e relatively closer in an axial direction to the inner race member 62e. A first retaining ring 114e, which can be received in a groove 604 in the first coupling portion 100e, can be engaged to the first coupling portion 100e to limit movement of the shaft member 68e relative to the inner race member 62e in an axially outward direction, while a shoulder 602 can be formed on the shaft member 68e and configured to contact the inner race member 62e to limit movement of the shaft member 68e relative to the inner race member 62e in an axially inward direction. In the particular example provided, the shoulder 602 and the first retaining ring 114e cooperate to substantially eliminate axial movement of the shaft member 68e relative to the inner race member 62e (i.e., relative axial movement is less than or equal to about 0.1 inch).

A second retaining ring 200e can be fitted into an annular groove 204e on the male segment 132e and can be employed to retain the male segment 132e to the shaft member 68e. In the example provided, an annular groove 202e is formed in the second coupling portion 102e for receipt of the second retaining ring 200e. If desired, a seal may be employed to seal the interface between the male segment 132e and the second coupling portion 102e. In the example illustrated, an o-ring seal 608 is received into a seal groove 610 formed in the male segment 132e and is configured to sealingly engage a seal bore 612 formed in the second coupling portion 102e forwardly of the interior splines. A compression feature, such as a chamfer 614, can be formed on the second coupling portion 102e to aid in compressing the second retaining ring 200e and/or the o-ring 608 when the male segment 132e is inserted into the second coupling portion 102e.

Figure 14:
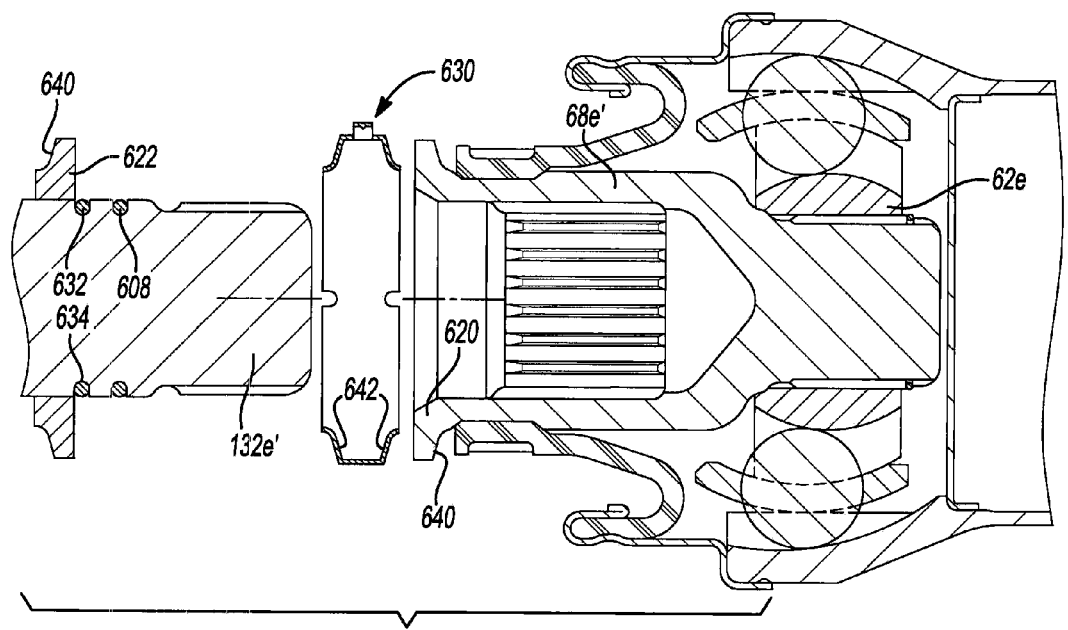
FIG. 14 is a longitudinal cross-sectional view of a constant velocity joint that is similar to that of FIG. 12.
Figure 15:
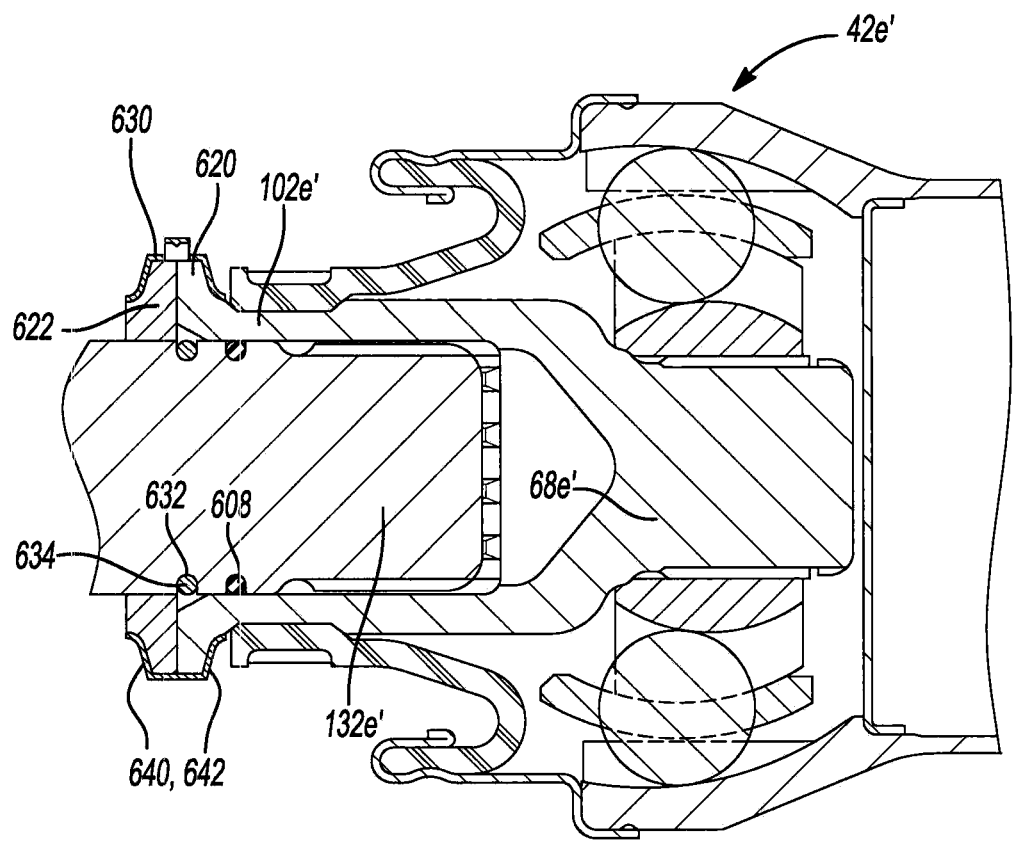
FIG. 15 is a view similar to that of FIG. 14 but depicting a clamp coupling a male segment to a shaft member of the constant velocity joint.

With reference to FIGS. 14 and 15, an alternatively constructed constant velocity joint 42e' is shown to be similar to the constant velocity joint 42e of FIGS. 12 and 13. In this example, coupling flanges 620 and 622 are coupled to the shaft member 68e' and the male segment 132e', respectively, and a clamp 630 is employed to axially secure the coupling flanges 620 and 622 to one another. The coupling flanges 620 and 622 may be integrally formed with the shaft member 68e' and the male segment 132e', respectively, or may be discrete components that are assembled to a remainder of the shaft member 68e' and the male segment 132e', respectively. In the particular example provided, the coupling flange 620 is integrally formed with the shaft member 68e', while the coupling flange 622 is a discrete component that is slidably received onto the shaft member 132e'. Any desired means may be employed to inhibit axial movement of the coupling flange 622 relative to the shaft member 132e' in at least one axial direction. In the particular example provided, a retaining ring 632 is received into an annular groove 634 in the male segment 132e' forwardly of the o-ring 608; the retaining ring 632 limits rearward movement of the coupling flange 622 toward the rear of the male segment 132e'.

The coupling flanges 620 and 622 include generally frusto-conical flange mount surfaces 640 that are engaged by corresponding generally frusto-conical clamp mount surfaces 642 on the clamp 630 as is described in International Patent Application No. PCT/EP2005/005002 (Publication No. WO 2005/111488), the disclosure of which is hereby incorporated by reference as if fully set forth in detail herein. Briefly, constriction of the clamp 630 about the coupling flanges 620 and 622 causes corresponding engagement of the clamp mount surfaces 642 with the flange mount surfaces 640 to thereby draw the male segment 132e' into the shaft member 68e'. The clamp 630 may be tightened about the coupling flanges 620 and 622 such that an axially directed clamping force is applied through the flange mount surfaces 640. Alternatively, the clamp 630 may be tightened about the coupling flanges 620 and 622 to a lesser extent that limits axial movement of the coupling flange 622 relative to the coupling flange 620.

It will be appreciated that the coupling flange 620 (and optionally the coupling flange 622) may be employed in other situations, such as to aid in the installation of the male segment to the second coupling portion 102e'. For example, the male segment 132e' may be configured in an interference fit relative to the internal splines of the second coupling portion 102e' (i.e., the external splines of the male segment 132e' can be larger than the internal splines of the second coupling portion 102e'). A tool, such as a hydraulically-operated clamp (not shown) having generally U-shaped jaws that can be indexed toward one another could be employed to force the male segment 132e' into the second coupling portion 102e'.

It will be appreciated that in each of the above-described examples, the male splined portion of the shaft member (i.e., the first coupling portion) is received into the inner race member and located axially within the bearing tracks of the inner race member. It will also be appreciated that the first coupling portion of the shaft member may be coupled to the inner race member in any desired manner, including welds and/or an interference fit, in addition to or in lieu of the splined connection described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shaft assembly comprising:
 a propeller shaft having first and second opposite ends;
 a first universal joint fixed to the first end of the propeller shaft; and
 a second universal joint fixed to the second end of the propeller shaft, the second universal joint comprising a constant velocity joint having an outer race member, an inner race member, a plurality of balls, a shaft member and a boot seal, the outer race member defining a plurality of first bearing surfaces and being directly fixed to the propeller shaft for common rotation about an axis defined by the propeller shaft, the inner race member defining a plurality of second bearing surfaces that extend along the entire axial length of the inner race member, the plurality of balls being received between the inner race member and the outer race member and engaging the first and second bearing surfaces to transmit rotary power between the outer and inner race members, the inner race member having a splined internal aperture, the shaft member having a first coupling portion and a second coupling portion, the first coupling portion having a male-splined segment that is engaged to the splined internal aperture to thereby non-rotatably couple the shaft member to the inner race member, the second coupling portion comprising an internally splined bore that is adapted to engage a male splined shaft segment, the boot seal being coupled to the outer race and the shaft member.

2. The shaft assembly of claim 1, wherein the inner race member comprises a plurality of bearing tracks and wherein the male-splined segment is entirely disposed axially within the bearing tracks.

3. The shaft assembly of claim 1, wherein the splined internal aperture and the male-splined segment are coupled together via an interference fit.

4. The shaft assembly of claim 1, wherein the first coupling portion is substantially non-movable in an axial direction relative to the inner race member.

5. The shaft assembly of claim 1, wherein the first coupling portion and the inner race member are coupled together in a lashless manner.

6. The shaft assembly of claim 1, wherein the second coupling portion comprises a coupling flange.

* * * * *